No. 654,866. Patented July 31, 1900.
J. ANGUS.
DUST ARRESTER.
(Application filed Jan. 12, 1900.)
(No Model.)
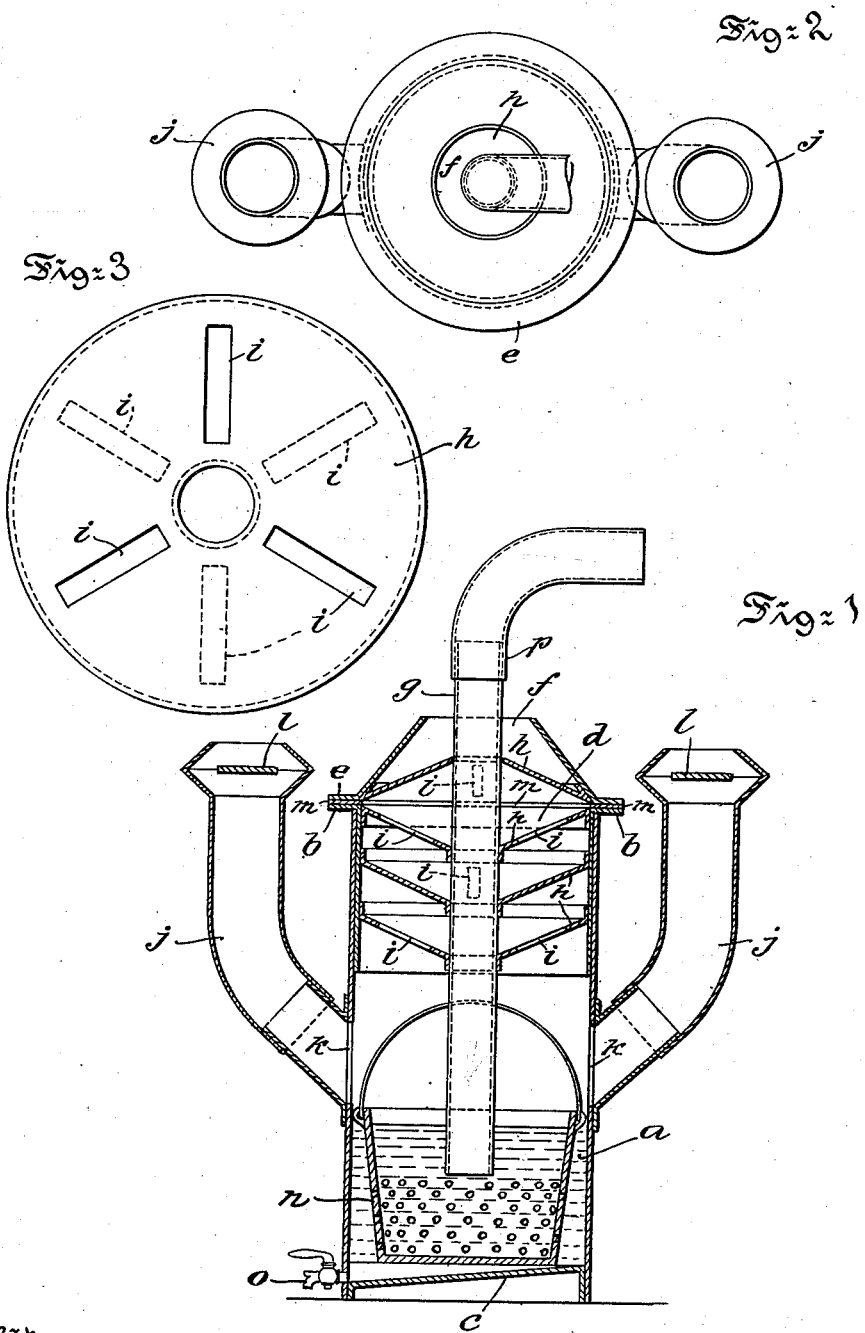

UNITED STATES PATENT OFFICE.

JAMES ANGUS, OF PHILADELPHIA, PENNSYLVANIA.

DUST-ARRESTER.

SPECIFICATION forming part of Letters Patent No. 654,866, dated July 31, 1900.

Application filed January 12, 1900. Serial No. 1,202. (No model.)

*To all whom it may concern:*

Be it known that I, JAMES ANGUS, a citizen of the United States, and a resident of the city and county of Philadelphia, State of Pennsylvania, have invented certain new and useful Improvements in Dust-Arresters, of which the following is a specification.

My invention relates to improvements in devices for arresting and collecting dust; and the object of my invention is to furnish an inexpensive and efficient apparatus for collecting the dust from polishing, grinding, or other similar machines.

In the accompanying drawings, forming part of this specification, and in which similar letters of reference indicate similar parts throughout the several views, Figure 1 is a central sectional elevation of my improved dust arresting and collecting device; Fig. 2, a plan of the device; Fig. 3, an enlarged plan of the main baffle-plates, showing the arrangement of air-passages therein.

$a$ is a vessel preferably cylindrical in form and constructed of metal. The upper end of this vessel is furnished with a flange $b$, and its lower end is closed by a sloping bottom $c$.

$d$ is a chamber the lower end of which enters the upper end of vessel $a$ and which is furnished with a flange $e$ on its lower end, resting on and bolted to the flange $b$ of vessel $a$. The top of chamber $d$ is conical in form and is furnished with an opening $f$, through the center of which passes a pipe $g$, which is connected with a blower of any suitable pattern, (not shown,) which forces the dust from the machine through pipe $g$, the lower end of which dips under the surface of a body of water carried in the lower end of vessel $a$.

$h$ are baffle-plates within chamber $d$. These plates are conical in form, their bases being secured to the sides of chamber $d$ and their other ends to the pipe $g$. $i$ are holes in the baffle-plates, the holes in one plate staggering those in the one next above.

$k$ are air-outlets in vessel $a$ above the water-line. $j$ are pipes connected with these outlets and extending upward, as shown.

$l$ are baffle-plates in pipes $j$.

$m$ is a gasket making a tight joint between the flanges on vessel $a$ and chamber $d$; $n$, a basket or bucket the sides of which are furnished with numerous perforations, which is placed within vessel $a$ and into which the dust from pipe $g$ may be discharged.

$o$ is a faucet in bottom of vessel $a$, through which the water in this vessel may be drawn off when desired.

The operation of the device is as follows: The dust is blown from the machine in the usual manner to and through the pipe $g$ and is discharged into the water in vessel $a$, which retains it and prevents its escape. Part of the air which has carried the dust passes up through the holes in the baffle-plates $h$ and out through the hole $f$ in the top of chamber $d$, and the balance passes up through and out of the pipes $j$. The air entering through pipe $g$ is under a high pressure and causes a great commotion in the water in vessel $a$. In order to prevent the escape of this water, the baffle-plates $h$ and the long pipes $j$, with baffle-plates $l$, are employed, and in order that there may be no obstruction to the free passage of the air from the device the area of the several outlets is very considerably greater than the area of the inlet-pipe $g$. If the basket or bucket $n$ is used, the greater part of the dust collected by the water is retained therein and is removed by lifting the bucket or basket from vessel $a$. The bucket or basket is furnished with perforations through which the water may drain when it is lifted. The water remaining in the vessel $a$ and the dust carried thereby may be drawn off as frequently as desired through faucet $o$.

In order to obtain access to the bucket $n$, the chamber $d$, which forms the top for the vessel $a$, is removed. To permit this, the pipe $g$ is jointed at $p$ and can be readily disconnected at this joint, and when the chamber $d$ is lifted the lower part of the pipe $g$, which is secured to the baffle-plates $h$, is lifted with it.

Having thus described my invention, I claim—

1. In an apparatus for separating dust from air, in combination, a vessel carrying water in its lower end, air-escape pipes connected with said vessel above the water-level, a detachable chamber secured to the upper end of said vessel and furnished with an outlet at its upper end, perforated baffle-plates carried by said chamber, and a dust-pipe passing down through said chamber and baffle-plates and discharging below the level of the water in said vessel.

2. In an apparatus for separating dust from air, in combination, a water-carrying vessel $a$, air-pipes $j$ connected with said vessel above the water-level, baffle-plates $l$ within said pipes, a removable chamber $d$ furnished with an opening in its top, perforated baffle-plates $h$ within said chamber and a dust-pipe $g$ passing centrally downward through said chamber secured to said baffle-plates and discharging into the water in vessel $a$.

3. In an apparatus for separating dust from air, in combination, a water-carrying vessel $a$ having an inclined bottom, a faucet $o$, air-exhaust pipes $j$ connected with said vessel above the water-level, baffle-plates $l$ within said pipes, a removable chamber $d$ extending downwardly into said vessel furnished with an opening in its top, conical perforated baffle-plates within said chamber, a dust-pipe $g$ passing centrally downward through said chamber secured to said baffle-plates and discharging below the water-level in said vessel, and a perforated removable basket or bucket, all substantially as and for the purposes set forth.

JAMES ANGUS.

Witnesses:
CHARLES A. RUTTEN,
J. CRAIG SHIELDS.